United States Patent
Hinn (10) Patent No.: US 7,460,980 B2
(45) Date of Patent: Dec. 2, 2008

(54) METHOD FOR THE CONTROL OF A PIPE INSPECTION SYSTEM AND FOR THE EVALUATION OF THE INSPECTION DATA

(75) Inventor: Albert K. Hinn, Ebersbach (DE)

(73) Assignee: Rico Gesellschaft fur Mikroelektronik, Kempten (DE)

( * ) Notice: Subject to any disclaimer, the term of this patent is extended or adjusted under 35 U.S.C. 154(b) by 77 days.

(21) Appl. No.: 11/629,453

(22) PCT Filed: Apr. 23, 2005

(86) PCT No.: PCT/EP2005/004381

§ 371 (c)(1),
(2), (4) Date: Dec. 13, 2006

(87) PCT Pub. No.: WO2006/000271

PCT Pub. Date: Jan. 5, 2006

(65) Prior Publication Data

US 2008/0021662 A1 Jan. 24, 2008

(30) Foreign Application Priority Data

Jun. 23, 2004 (WO) .................... PCT/EP04/006780

(51) Int. Cl.
*G01C 9/00* (2006.01)

(52) U.S. Cl. .................... 702/151; 73/634; 324/220; 405/184.2; 702/187

(58) Field of Classification Search .................. 702/34, 702/35, 81–83, 181, 182, 187; 73/634; 318/568.11, 318/568.12; 348/84; 356/241.3; 382/149, 382/156; 250/310, 311; 324/220; 405/184.2
See application file for complete search history.

(56) References Cited

U.S. PATENT DOCUMENTS

| | | | | |
|---|---|---|---|---|
| 4,560,931 A | * | 12/1985 | Murakami et al. | 324/220 |
| 4,974,168 A | * | 11/1990 | Marx | 702/187 |
| 5,497,662 A | * | 3/1996 | Dykes | 73/634 |
| 7,073,979 B2 | * | 7/2006 | McGrew et al. | 405/184.2 |

FOREIGN PATENT DOCUMENTS

| | | |
|---|---|---|
| DE | A 36 05 654 | 9/1987 |
| DE | 40 17 238 A1 | 12/1991 |
| DE | 42 06 609 A1 | 9/1993 |
| EP | 0 623 814 A2 | 11/1994 |
| EP | 1 022 553 A2 | 7/2000 |
| GB | 2 342 419 | 4/2000 |
| WO | WO 2004/113861 A1 | 12/2004 |

* cited by examiner

*Primary Examiner*—John H Le
(74) *Attorney, Agent, or Firm*—Notaro & Michalos P.C (57) ABSTRACT

A method for operating a mobile pipe inspection device includes a camera head that can be pivoted about two axes that lie at right angles to one another. The pivoting movements of the camera head are remotely controlled by motors and at least one pivoting movement is measured by a rotational angle sensor, whose measurement signal can be displayed and evaluated on a monitor. An improved evaluation and both the quantitative and qualitative documentation of the inspection result. To achieve this, two sets of image information are generated, one set containing image information of the entire pipe surface and the second set containing information about the details of the pipe surface, both sets of information being automatically assigned to one another at least with respect to the location in the pipe section and the angular position.

19 Claims, 4 Drawing Sheets

METHOD FOR THE CONTROL OF A PIPE INSPECTION SYSTEM AND FOR THE EVALUATION OF THE INSPECTION DATA

The invention relates to a method for operating a drivable pipe inspection apparatus comprising a camera head swivellable about two axes orthogonal with respect to one another, whose swivel motions are caused by remote-controllable motors and at least one swivel motion is measured by means of a rotational angle measurement value transducer whose measuring signal can be displayed and evaluated on a monitor.

BACKGROUND OF THE RELATED ART

Pipes are visually checked by means of remote controlled carriages, on which cameras are mounted. Such camera carriage or dolly is disclosed for example in WO 2004/113861 A1. The camera or the several cameras mounted on the carriage for different purposes with different optical systems can be rotated, swivelled and also varied in height by means of an electric scissor linkage. The cameras generate an image stream which is evaluated. To document the ascertained sites of damage it is desirable to be able to document the location of the damaged sites. For example, from DE-A 36 05 654 a method is known in which the electrical signals from rotational angle transducers are digitally displayed on a monitor outside of the pipe. To identify the damaged site, the camera must be focused in the particular line of vision. Assessing the order of magnitude of a damaged site is only incompletely possible with this method.

To improve the evaluation capability, EP 0 623 814 A2 proposes a method for operating a drivable pipe inspection apparatus comprising a camera head swivellable about two orthogonal axes, whose swivel motion is brought about by remote-controllable motors and measured by rotational angle transducers, whose signals can be displayed and evaluated on a monitor. The measuring signals of the rotational angle transducer are supplied to electronic evaluation circuitry, which, after input or measurement of pipe-specific constants, proportional to the pipe radius and the pipe axial distance of the camera objective lens, calculates the length of the line of sight between camera objective lens and a target point on the inner surface of the pipe and, as a function of it, can determine different values by calculation by means of electronic evaluation circuitry.

In this way damaged sites could be digitally documented with respect to their position and location and their distances.

To arrive on the basis of these individual considerations of different objects at an acquisition of the entire pipe and to inspect all places of the pipe at any desired angle, EP 1 022 553 A2 proposes equipping a camera carriage with an illumination device and two electronic cameras, of which the one is located at a front end of the camera carriage and the other camera at the rear end of the camera carriage, each with a wide angle objective lens acquiring a hemispheric space, the optical axes of the two wide-angle objective lenses extending parallel to one another in the opposite direction. The recorded images of the two acquired hemispheric spaces are combined by calculation at specific time or space intervals to a spheric full image taking into consideration the distance of the optic centers of the two cameras.

The particular position of the camera units in space at the time of exposure can be acquired and stored at the time in order to compensate during the combining a roll-[axis] or inclination discrepancy of the two cameras.

Obtaining these digital fully spherical panoramic images subsequently permits virtually driving through the pipe on the basis of the stored image data, and a critical location can then be approached by calculation thereby that the corresponding spherical coordinates and stretch positions of the location to be inspected are entered.

Of disadvantage in this method is that very high computing expenditures are necessary for combining the spherical images and an especially high data stream must be supplied to the correspondingly large stores. The evaluation is divided into two steps. Immediate decisions are not possible using this method.

Since the interpretation of the image data requires a precise orientation within the pipe, and this is visually only possible in the presence of residual fluids in the pipe, GB 2 342 419 A proposes providing two different cameras, of which one is directed in the direction of the pipe for orientation and a second one radially onto the surface of the pipe. This camera directed laterally can be rotated about the longitudinal axis of the inspection head.

The disadvantage of the perspectively shortened images, which scarcely make possible the exact technical evaluation by measurement, is counteracted in DE 42 06 609 A1 with a modified camera head with two optical channels. The line of sight of the first optical channel utilized for the control of the carriage extends here in the pipe direction and that of the second optical channel, supplying the images of the inner wall of the pipe, perpendicularly to the pipe wall. The two optical channels, perpendicular to one another, of the camera head operate in different spectral ranges and are so combined via an optics assembly, for example a beam splitter, that they have a common optical axis. The images recorded by a CCD color matrix are separated again by a signal processing group into two black-and-white images, of which one contains the image information of the pipe wall and the other the image information of the second line of sight.

For better orientation DE 40 17 238 A1 describes a damage locating method and a device for locating leakages in channels with the aid of a GEO radar. For the correlation of the measurement results with the associated spatial locations, sensors for the position orientation of the carriage frame and/or of the antennas are provided. These can inter alia serve for determining the requisite location information by means of a gravitational or inertial system and should inter alia make possible measuring the stretch traversed in the pipe. The inspection results are displayed as a runtime chart. With such methods it is also possible to locate damaged sites outside of the pipe in the ground.

Of disadvantage in all methods is that an automated simple inspection of channels is not possible. The image data are generally obtained first and only evaluated quantitatively in a second step.

SUMMARY OF THE INVENTION

The invention aims to specify a method for the control of a pipe inspection system and for the evaluation of the inspection data, which also permits improved evaluation and the quantitative as well as also qualitative documentation of the inspection result.

This aim is achieved in a method according to the species thereby that two sets of image information are created, of which a first set contains image information of the entire pipe surface, and a second set information of details of the pipe surface and the automatic assignment of the two sets of information to each other takes place at least with respect to the location in the pipe section and the angular position. The first set of image information serves for the complete visual documentation of the interior pipe surface. It is created in addition to the second set which serves for the documentation of details. According to the invention, thus, in addition to the documentation of damages of a pipe line, the current state of the pipe line can also be seamlessly be acquired overall and be stored permanently on data media or paper. During the restructuring or monitoring of pipe sections, not only the individual damage is of significance, but also the demonstration that no further damage is present. The development of the circumference yields such a seamless image. The detail image permits, moreover, the precise damage diagnosis. For the linkage, the sets also contain information regarding the location and the angular position of the image information.

An embodiment of the method advantageously provides that the first set of image information is preferably subjected to a processing for the recognition of patterns, in particular detection of edges, and therefrom signals, preferably for the conduction to a control, are generated. This measure permits the automation of the measuring process.

When the first set of image information is combined in the form of a visual development of the pipe surface, is stored and/or displayed, the inspector can monitor the progress and can check it, such that it is also feasible to intervene in unexpected difficulties.

A detailed impression of the state of the pipe or the extent of damages can be obtained if the second set of image information is combined, stored and/or displayed in the form of a single image, for example of the development of a pipe joining site or of an image of a branch or a damaged site.

A further embodiment of the method provides that the inspection of details takes place separately in time from the recording of the development. Thereby in particular the necessary bandwidth for the data transmission can be advantageously decreased. For example the details can be inspected during the drive of the camera carriage into the pipe. For this purpose the camera with the higher resolution and magnification can be utilized, which, through its universal suspension, can in this case scan the pipe in all directions. Before the return travel the optical axis of the other camera is subsequently swivelled parallel to the camera carriage axis and during the return travel the entire pipe circumference is scanned and recorded by means of a suitable optical system, for example by means of a fisheye lens.

One feasibility is comprised of utilizing only one or several annular image lines of the digitized image of the fisheye lens in each instance and to combine these by means of a computer, preferably in real time to form a development of the circumference of the inspected pipe section. The number of image lines can therein be adapted by calculation as a function of the frequency of the images supplied by the camera, the so-called frame rate, and the travel speed of the camera carriage. For this purpose the method according to the invention provides that the recording of the first set, which contains the image information of the development, takes place during a travel through the pipe section to be inspected, preferably in one direction and preferably with constant speed.

A further feasibility comprises for example conjoining the images to a development by means of known software. This software joins images on the basis of similar picture elements.

Evaluating the inspection results is especially facilitated if an automatic assignment takes place of one or several of the inspected details to a location of the developed circumference. The damaged location with its detailed documentation can be brought permanently into unique interrelationship with its precise position in the inspected pipe section. This takes place through the corresponding software-supported linkage of the position coordinates with the obtained image material. The position or the particular location of the camera carriage can be determined for example by measuring the unwound cable length in connection with a reference point.

The automatic measuring and evaluation method proceeds as follows:

The camera carriage located in the pipe and the cameras are switched on. The camera is oriented parallel to the pipe axis. The camera axis is raised by means of electrically driven parallelogram linkage bars into the pipe axis. This can take place for example through suitable processing of the image stream, which signals that the pipe axis has been reached thereby that the image is centered. The carriage is subsequently launched and the pipe circumference is visually scanned linewise in temporal or spatial steps. The scanning can for example take place by adjoining annular lines of a so-called fisheye camera.

Another feasibility is comprised of steadily rotating a camera directed onto the pipe wall about the pipe axis. Through the superposition of the rotational movement of the camera and the travel movement of the travel carriage a helical scanning of the interior surface of the pipe results and these image informations can be adjoined with one another with suitable algorithms to form a corresponding image of this camera.

The image stream of the pipe wall surface is processed through known mathematical processing methods, so-called filters, which in the image stream lead to an edge detection. As soon as through the filtering the presence of a joining site is detected, the filter signal brings the travel carriage to a standstill and reverses the travel direction of the travel carriage in order to move the travel carriage by a distance which corresponds to the optical distance of the camera scanning the pipe circumference from the high-resolution camera. The optical axis of the high-resolution camera is swivelled by 90 degrees such that it is directed onto the pipe wall. This image stream is also advantageously analyzed with an edge detection filter. The filter signal can be utilized for the purpose of so moving the travel carriage that the joining site lies centrally in the image of the high-resolution camera. As soon as the joining site has been approached by the camera carriage, the high-resolution camera zooms the joining site at maximum resolution into the image and is rotated about the pipe axis by 360 degrees.

In this way a highly resolved image of the pipe circumference at the joining site is automatically generated and stored.

After recording the joining site, the high-resolution camera swivels again into the axis of the pipe and sets the travel carriage again into motion in the direction of the pipe section to be inspected until, as previously described, the next joining site is detected.

This procedure is repeated until a preset stretch of the pipe has been passed through.

As an alternative to the previously described process, it is also feasible to divide the horizontal forward-directed image of the high-resolution camera into concentric image segments and filter it such that the joining site and their edges are detected by means of a suitable digital image filter. During the further advance of the travel carriage the high-resolution camera jointly swivels simultaneously with direction onto the joining site until it is directed vertically onto the pipe wall and the travel carriage follows until the joining site is located approximately centrally in the image. After bringing the travel carriage to a standstill, the camera is subsequently again rotated about the pipe axis by 360 degrees such that in this way a development of the joining site can also be displayed in high resolution. In the case of this method a single camera suffices.

The optical axis of the camera subsequently swivels again into the axis of the pipe and the travel carriage is set into motion to continue the inspection drive.

This process is also repeated until a preset inspection stretch has been reached.

In a further alternative implementation of the automatic measuring method it is feasible to allow the high-resolution camera to be rotated while being continuously directed perpendicularly onto the pipe wall during the travel of the travel carriage. Thereby an image data stream results, which can be conjoined helically to an image of the pipe surface. The image data of this pipe are also supplied to an edge detection filter, which, upon the detection of an edge, as soon as such edge is located approximately centrally in the angle of the camera, brings the carriage to a standstill and subsequently stores the data over a camera pan of 360 degrees about the pipe axis as a scan of the joining site. The camera carriage is subsequently, as before, set into motion again in the same direction. Of advantage in this solution is that no second camera is necessary.

Through suitable gravitational sensors and angle transmitters the precise position and location of the camera is synchronously assigned to the image stream. These data serve for documenting the inspection result in advantageous manner and to store it.

The documentation of branches or local damages is also automatically feasible. For this purpose the second set of image information is subjected to a suitable filtering, which identifies such damages and sets the travel carriage still. After a potentially necessary move of the travel carriage about the optical distance of the filtered and of the image stream to be documented, in this position of the travel carriage the documenting, advantageously high-resolution, camera is again swivelled until the branch or the damaged site is located approximately centrally in the angle of view and subsequently the corresponding image with associated angle and location information can be stored.

As soon as the image is stored, the documenting high-resolution camera swivels again into the axis of the pipe and the inspection drive is continued.

It is understood that during continuous travel through the pipe section to be inspected the set of image information containing the circumference of the pipe section can also be generated separately from the other set of image information containing the details. Through the described filtering, for example, first the location of the joining site is ascertained and subsequently, during the return travel, the camera carriage is stopped precisely at the location of the joining site in order to record subsequently through the camera directed perpendicularly onto the pipe surface 360 degrees of the pipe circumference as an image. These two sets of image information can subsequently be related to one another via the location information of the camera carriage. This inspection method also proceeds automatically analogously to the previously described alternatives.

The drawing serves for a better understanding of the invention. In conjunction with the Figures of the drawing a preferred embodiment example will be explained in further detail. In the drawing depict.

BRIEF DESCRIPTION OF THE DRAWINGS

DETAILED DESCRIPTION OF THE INVENTION

Figure 1:
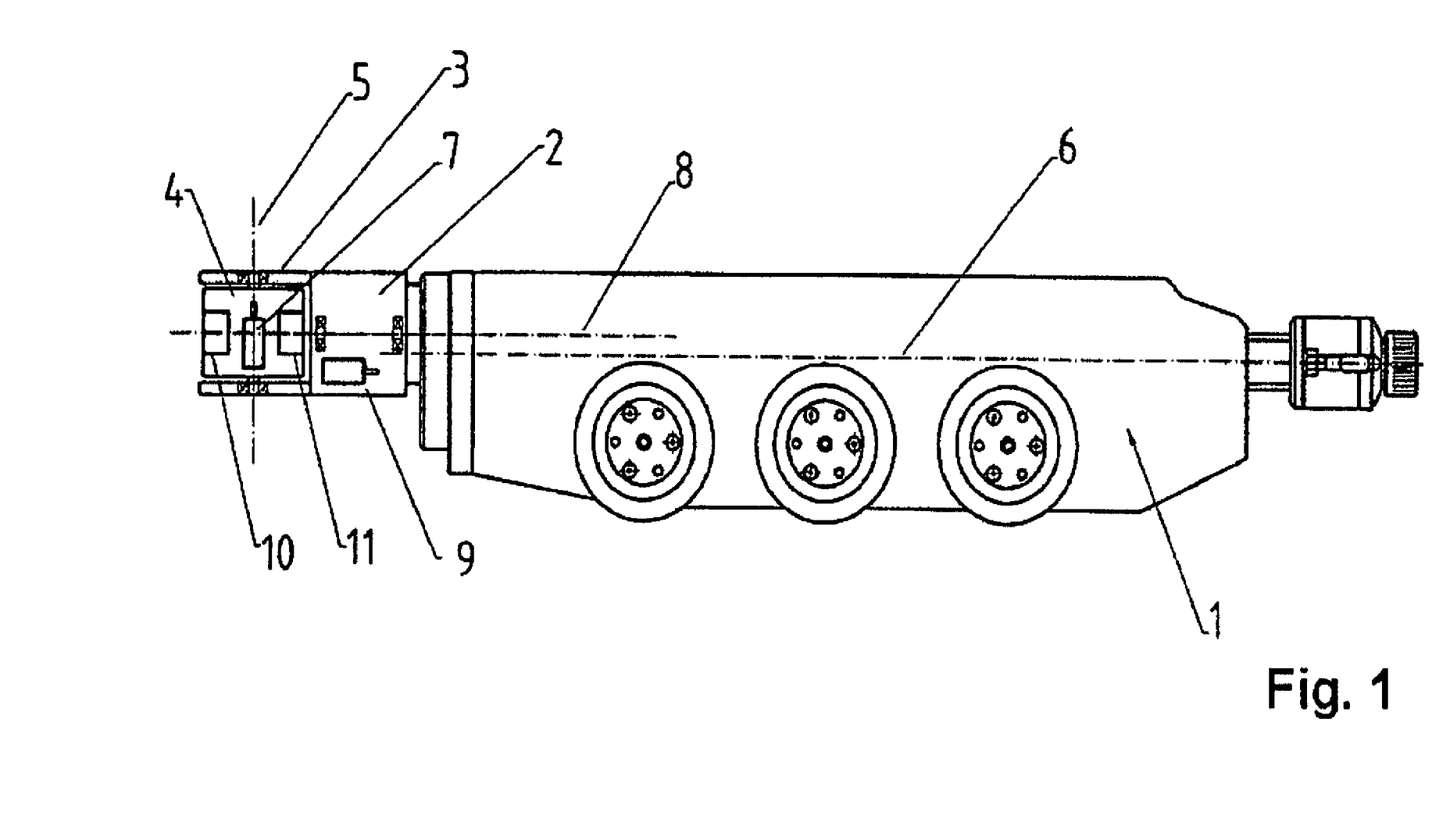
FIG. 1: a schematic illustration of a known camera carriage.

FIG. 1 depicts a camera carriage 1 with chassis and illumination device for inspecting pipe lines. The camera carriage is connected with the environs outside of the pipe by means of data and energy supply cables. These are wound outside of the pipe onto one or several cable reels and can be unrolled according to the travel depth. It is understood that it is also conceivable to provide the camera carriage with an energy supply device, in particular with a battery or a rechargeable battery. For the transmission of control and data signals in this case corresponding transmitting and/or receiving devices are provided.

At the front side of the camera carriage an articulation fork 2 is provided. Between the two arms 3 of the articulation fork 2 a rotatable housing 4 is provided. The housing in this embodiment example is supported between the arms 3 such that it is pivotable about an axis 5. The axis 5 is disposed orthogonally with respect to the vehicle longitudinal axis 6.

As means for swivelling the housing 4 about the axis 5 an electromotor 7 is disposed within the housing 4.

The articulation fork 2 is furthermore supported rotatable about an axis 8 corresponding to the longitudinal axis of the articulation fork 2. For this purpose an electromotor 9 is provided within the articulation fork 2. It is understood that the electromotor 9 is located within the camera carriage 1.

The housing 4 is thus rotatable about two axes 5, 8 which are orthogonal with respect to one another.

Within housing 4 two cameras 10, 11 are located. In this embodiment example these are two different cameras. Camera 10 has an aperture angle of maximally 46 degrees and is equipped with an objective lens with 10-fold optic zoom and a focal length of 4.2 to 42 mm. The image sensor is for example a high resolution CCD sensor.

Camera 11 is a camera with a fisheye objective lens. Hereby recordings of the hemispheric space can be actuated. By swivelling the housing about one or both axes the particular required camera can be moved into the desired position, in particular into a straight-ahead position. The straight-ahead position is located parallel to the vehicle longitudinal axis 6. In the depicted embodiment example a continuous rotation of the housing by 360 degrees about each axis 5, 8 is feasible. However, a configuration is also conceivable, in which the swivel axis 5 only makes possible limited swivel angles determined by stops. The cameras 10 and 11 are in this case disposed in housing 4 such that each of the two cameras can be positioned into the straight-ahead position parallel to the travel carriage longitudinal axis 6. For energy and data transmission slip rings, not shown here, are utilized.

However, the two cameras can also be disposed at a 90-degree angle with respect to one another. By swivelling the housing 4 about axis 5 the particular required camera 10, 11 can be moved into a straight-ahead position.

Figure 2:
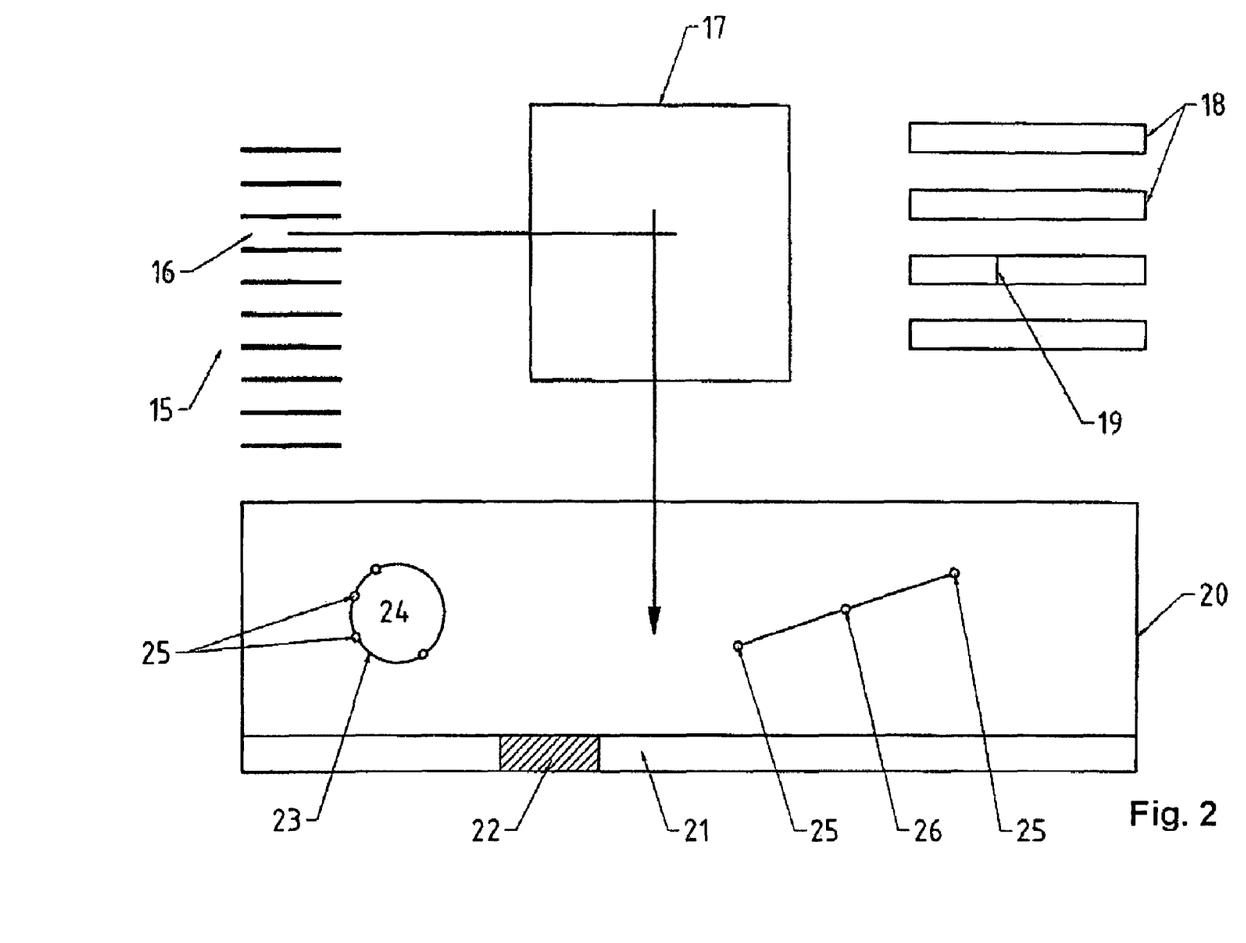
FIG. 2: a representation of the inspection data in the form of a schematic monitor image.

FIG. 2 shows in the form of a schematic monitor image that, due to the method according to the invention, a very clear and graphically suitable display of the inspection result is feasible. To the individual damage images, which are available documented in detail, names can be assigned, which in the form of a list 15 are displayed on the monitor. As soon as an element 16 of the list 15 is marked, the recorded damage image is displayed in detailed representation in a detail region 17. For the orientation of the location of the course of the pipe line, at which is located the diagnosed damage, serves a relatively small representation of the circumference development of the pipe line, depicted in individual segments 18. The damaged location of the displayed detail is immediately identifiable through a noticeable marking 19. For the sake of completeness, the developed image of the pipe circumference is also depicted as an enlarged development detail 20.

A search of the image data can also be carried out by means of a scroll bar 21. By sliding the slide marker 22, due to the software-supported linkage of the image data in real time, the marker 19 is also shifted through segments 18 and the elements 16 of list 15 are also correspondingly emphasized and displayed in the detail region 17.

The representation of the development details 20 preferably takes place in Cartesian coordinates, the abscissa representing the location in the axial direction of the pipe line and the ordinate the circumferential angle of the instantaneous pipe line diameter. However, representation in other systems of coordinates is also possible.

Representation in Cartesian coordinates offers the advantage that it also permits graphically a quantitative damage documentation. For example, after opening a list with software tools, a so-called tool bar, a polygon 23 can be drawn with the aid of the cursor around a damaged region and its area 24 can be automatically determined and displayed.

Similarly, by setting two points 25 after starting an appropriate software tool, the interval of points 25 or the length of the stretch 26 can be displayed.

To represent the details the developed pipe circumference is advantageously cut open at 12 o'clock, thus at the top. The precise position of this cut can especially advantageously be specified automatically through a gravitational sensor. The bottom of a pipe is then located in the horizontal image center.

Due to the inspection method, an especially clear and visual representation and fast analysis of the extensive data material is feasible in this way.

Figure 3:
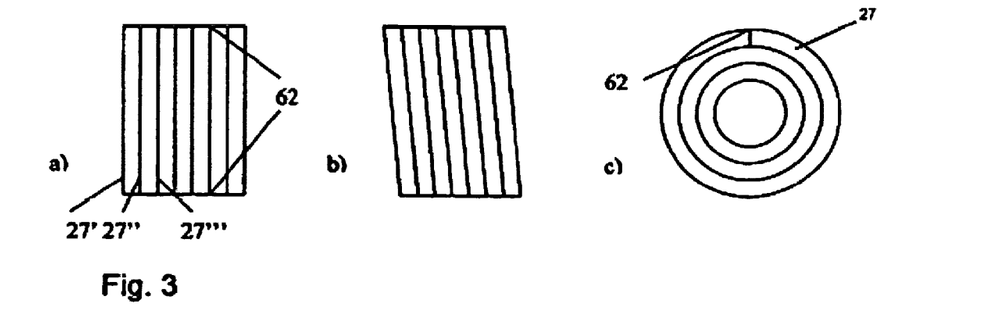
FIG. 3: a schematic representation of the method for evaluating the image data.

FIG. 3 shows three different sets of image information which are combined into different representations of the pipe circumference. FIG. 3*c*) shows concentric rings of a fisheye lens camera on its CCD. The information of the outermost concentric circle 27 can be cut open in an angular position at site 62 and subsequently according to FIG. 3*a*) sequential in time be combined in individual strips 27', 27'', 27''' . . . into an image of the pipe circumference.

If a camera is allowed to rotate directed perpendicularly onto the pipe circumference and the carriage is simultaneously moved, parallelograms disposed one next to the other result, which also yield an image of the pipe circumference if the image stream is interrupted during the passage through a certain angle of a full rotation and, according to the illustration, is arranged end to end. The image content of the strips joined into images, which, as shown, may be rectangular, parallelogram-shaped or concentric, can be studied with known methods of pattern recognition and, when a pattern threshold value is exceeded, can be drawn on for generating signals.

Figure 4:
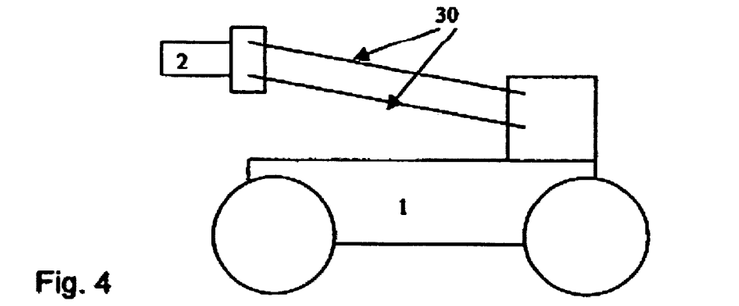
FIG. 4: schematically a side view of a travel carriage with parallelogram linkage bars.

FIG. 4 shows schematically the side view of a drivable pipe inspection apparatus, whose camera can be height-adjusted on parallelogram linkage bars 30, such that the camera axis can be moved into the center axis of a pipe.

Figure 5:
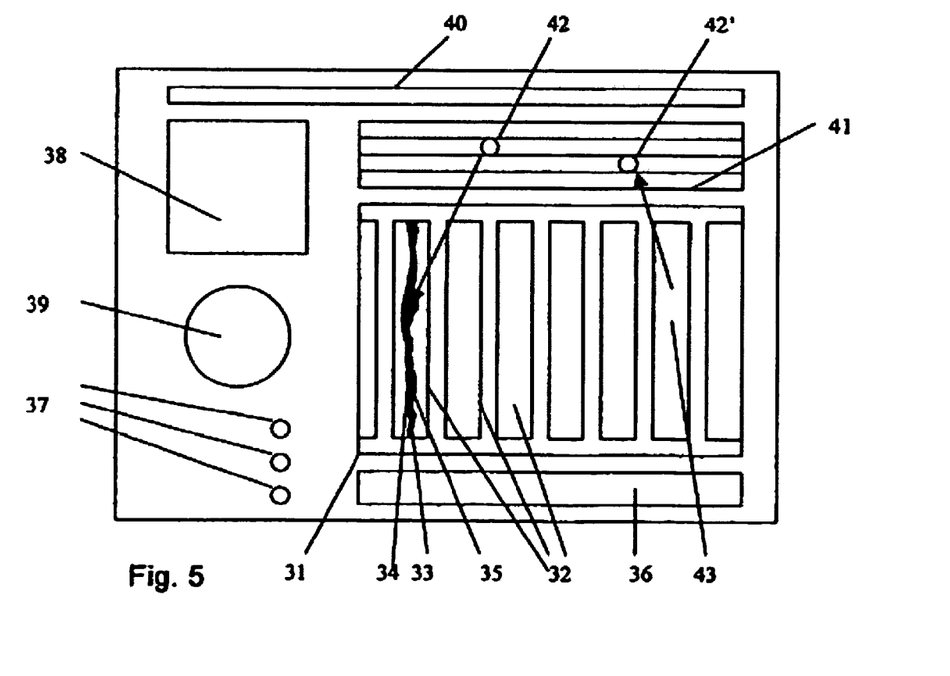
FIG. 5: another manner of representation of the inspection data in the form of a schematic monitor image.

FIG. 5 shows schematically the manner in which the inspection result is displayed on a monitor. In contrast to the display shown in FIG. 2, here in the image window 31 strip-form radial scans 32 of pipe joining sites 33 are shown one next to the other. The distance of the left edge 34 from the right edge 35 varies over the circumference. The minimum and maximum values are automatically determined and compared with a specified tolerance value displayed in field 36. The result of this comparison is also automatically assigned to different classes and, analogously to a traffic light, displayed prominently in the three colors red, yellow, green in the field group 37 of the operator. In field 38 all values are expressed in numerical form, while in field 39 a representation of the pipe section in the axial direction is displayed. The technical program status line with the available commands is denoted by 40. The field group 41 serves for navigating within the pipe section to be checked. If, for example, by means of a graphic input apparatus a marker 42 is set in the field group 41, then, as a function of the position of this marker 42, the associated joining site 33 is displayed in image window 31 with its axial image in field 39 and the associated values in field 38.

The automatic assignment also takes place if with the input apparatus for example the radial scan 43 is activated, the cursor is then shifted into position 42' and the associated data are displayed in the remaining field groups.

Figure 6:
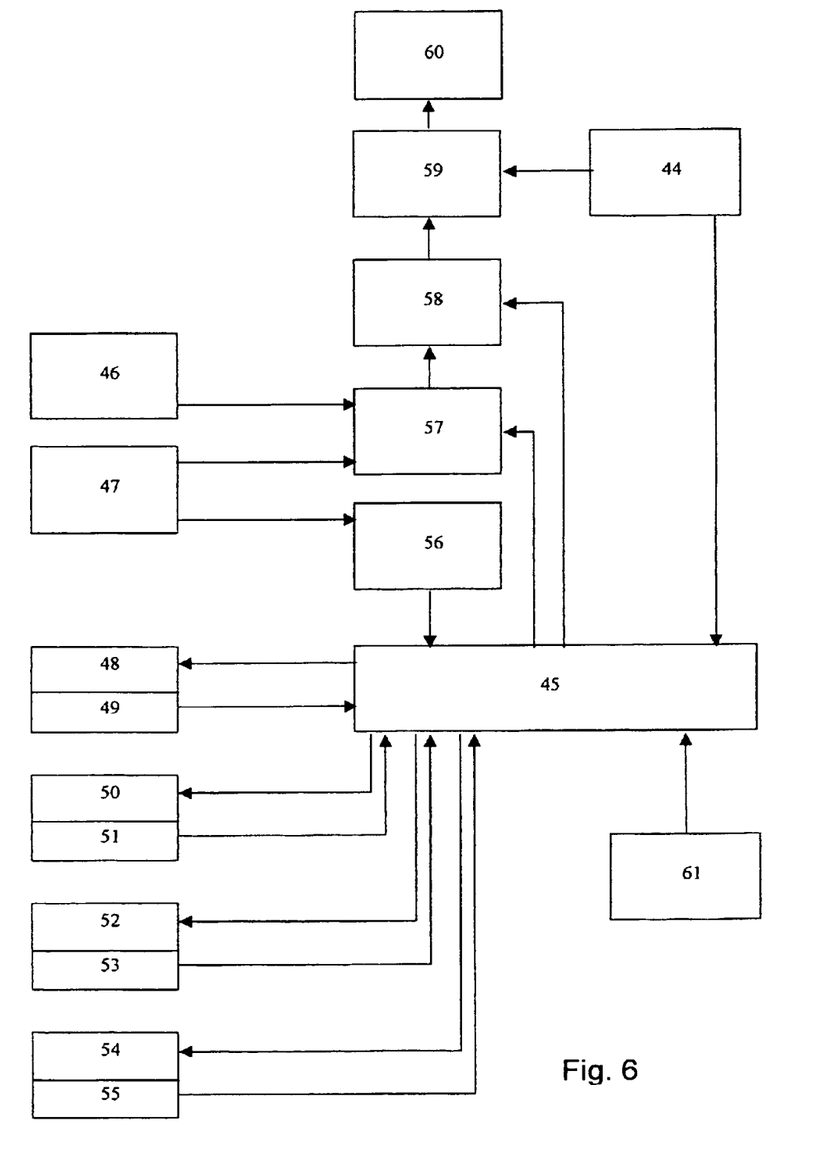
FIG. 6: a block representation of the essential parts of the inspection system.

FIG. 6 shows a schematic block circuit diagram to explain the method of operating the pipe inspection system. By means of an input apparatus, for example a keyboard 44, the start for the automatic inspection travel can be transmitted to the control 45. The control 45 moves the cameras 46 and 47 into the starting position. In the case of a combination of a camera with narrow angle but high resolution and a wide-angle camera with low resolution, wherein the wide-angle camera most often includes a fisheye objective lens, only the high-resolution camera needs to be moved into its starting position. Initially the swivel drive 48 is moved into the final position such that the optical axis of the high-resolution camera is oriented parallel to the pipe axis. A final position signal transmitter 49 reports reaching the final position to the control, which subsequently switches off the driving.

The rotary drive 50 can simultaneously be actuated until a rotational angle transmitter 51 signals the reaching of the nominal position and the control switches off the rotary drive.

The parallelogram linkage bar drive 52 can simultaneously also raise the camera head parallel to the pipe axis until the evaluated image signal of camera 46 signals the coaxial position of the camera axis with respect to the pipe axis. Alternatively, an angle transmitter 53 can also generate the end signal as soon as a height, corresponding to one half the diameter of the pipe to be inspected, of the camera axis in the pipe has been reached.

The drive motor 54 of the carriage is subsequently set into motion. A displacement sensor 55 continuously reports the traversed path back to the control. This displacement signal is synchronously with the image stream generated from cameras 46 and 47 added to the storage, such that the two image streams can be linked with one another via the signal of the displacement sensor. The signal of camera 47 with the lower resolution is subjected in block 56 to known mathematical methods for pattern recognition, in particular for edge detection. When a certain pattern threshold value is exceeded, block 56 generates a signal which is reported to the control.

This signal initiates an automatically proceeding movement sequence, such as previously described. For example, the control can stop the carriage and direct the camera with the higher image resolution onto a detail of the pipe surface.

In addition, the signal of camera 47, which generates a first set of image information, in block 57, taking into consideration the displacement information reported by the displacement sensor 55, is combined correct as to angle into an image of the entire developed pipe surface and deposited in store 58 with associated displacement information.

Camera 46, which generates the second set of image information, is also deposited in store 58 taking into consideration the displacement information reported by displacement sensor 55. Software operated in computer 59 accesses the data sets with image information deposited in store 58 and links these via the displacement information of displacement sensor 55 and displays these on the monitor 60 in the described form.

A gravitational sensor 61 mounted on the carriage serves for the correction of the signal generated by the angle transmitter 51, such that including this information in block 57, the picture elements always are cut open and combined in constant position with respect to gravity.

The invention claimed is:

1. A method for operating a drivable pipe inspection apparatus comprising:
providing a camera head swivellable about two orthogonal axes, said camera head having two optical cameras, one of which being a fisheye camera, the other one being a high resolution zoom camera;
providing remote control motors for causing whose swivel movements of the cameras about the two orthogonal axes;
measuring at least one swivel movement by means of a rotational angle transducer whose measurement signal can be displayed and evaluated on a monitor as image information;
creating two sets of image information, of which a first set contains image information of a developed pipe circumference and a second set contains information of details of a pipe surface;
automatically assigning the two information sets to one another at least with respect to a location in and an angular position of a pipe section; and
the assignment of the second set of information to a location of the developed pipe circumference being done through a software embodied on a computer readable medium supported permanent linkage of position coordinates of the location and angular position of the pipe section, with the obtained image information.

2. A method as claimed in claim 1, wherein the first set of image information is subjected to a processing for recognition of edges, and therefrom signals are generated for a control of the motors.

3. A method as claimed in claim 1, wherein the first set of image information is at least one of combined, stored and displayed in the form of a visual development of the pipe surface.

4. A method as claimed in claim 1, wherein the second set of image information is at least one of combined, stored and displayed in the form of a single image, including development of a pipe joining site or of an image of a branch or of a damaged site.

5. A method as claimed in claim 1, wherein the generation of the first and of the second set of image information takes place separated in time from one another and only subsequently an assignment of the two sets takes place via at least one of displacement information and angle information stored synchronously during the generation of the sets.

6. A method as claimed in claim 1, wherein an recording of the first set takes place during a travel through the pipe section to be inspected, in one direction and with constant speed.

7. A method as claimed in claim 1, wherein an automatic assignment takes place of one or several of the inspected details to a location of the developed circumference.

8. A method as claimed in claim 1, wherein the sets with image information of an inspection result are displayed as an image on a monitor, wherein the measuring of a stretch, of at least one of a circumference and of an area takes place by means of a cursor in the monitor image of the circumference developments.

9. A method as claimed in claim 1, wherein at least one of a display of a detail list on the monitor image, a marking of an element of the detail list, of a detail of a circumference development and a total image of the circumference development takes place in different image regions simultaneously on the monitor.

10. A method as claimed in claim 1, wherein an assignment between the image regions takes place automatically by marking in an image region.

11. A method as claimed in claim 1, wherein a cut position for the display of a developed pipe circumference is automatically specified by a gravitational sensor.

12. A method as claimed in claim 1, wherein image distortions are automatically compensated by said software to a true image of the pipe circumference.

13. A method as claimed in claim 1, wherein after a start signal drivable pipe inspection apparatus is automatically set into motion and therein an image information stream is generated which is subjected to a mathematical processing for pattern recognition and, in the presence of a specified pattern threshold value, a signal is generated, wherein the signal is utilized for at least one of storage of a location information, for the control of a carriage, for initiating a swivel motion of a camera directed onto the pipe surface and for actuating swivel drives of a camera, in order to direct the camera onto a detail of the pipe surface.

14. A method as claimed in claim 1, wherein the second set of image information is subjected to a processing for pattern recognition, in particular for edge detection, and a distance of the edges from one another is automatically determined, and from the values of a measured value, a minimal and maximal distance, is determined, which is compared in particular with a specified tolerance range, wherein if the value exceeds or falls below the specified range a signal is generated and at least one of displayed and stored.

15. A method as claimed in claim 1, wherein only the second set of image information combined to form images is at least one of displayed, stored and documented, only at least one of images of details and of developments of joining sites.

16. A method as claimed in claim 1, wherein only images of joining sites are at least ne of displayed, stored and documented, whose pattern recognition has indicated that the specified tolerance range has been exceeded.

17. A method as claimed in claim 1, wherein between the joining sites is displayed in decreased resolution the developed circumference of the pipe portion located between the joining sites.

18. A method for operating a drivable pipe inspection apparatus which comprises a camera head swivellable about two orthogonal axes, whose swivel movements is brought about by remote controllable motors, and at least one swivel movement is measured by means of a rotational angle transducer, whose measurement signal can be displayed and evaluated on a monitor, wherein two sets of image information are created, of which a first set contains image information of an entire pipe surface and a second set contains information of details of the pipe surface, and an automatic assignment of the two information sets to one another takes place at least with respect to a location in a pipe section and an angular position;

wherein after a start signal, the drivable pipe inspection apparatus is automatically set nto motion and therein an image information stream is generated which is subjected to a mathematical processing for pattern recognition and, in the presence of a specified pattern threshold value, a signal is generated, wherein the signal is utilized for at least one of storage of a location information, for the control of a carriage, for initiating a swivel motion of a camera directed onto the pipe surface and for actuating swivel drives of a camera, in order to direct the camera onto a detail of the pipe surface.

19. A method for operating a drivable pipe inspection apparatus which comprises a camera head wivellable about two orthogonal axes, whose swivel movements is brought about by remote controllable motors, and at least one swivel movement is measured by means of a rotational angle transducer, whose measurement signal can be displayed and evaluated on a monitor, wherein two sets of image information are created, of which a first set contains image information of an entire pipe surface and a second set contains information of details of the pipe surface, and an automatic assignment of the two information sets to one another takes place at least with respect to a location in a pipe section and an angular position;

wherein the second set of image information is subjected to a processing for pattern recognition, in particular for edge detection, and a distance of the edges from one another is automatically determined, and from the values of a measured value, a minimal and maximal distance, is determined, which is compared in particular with a specified tolerance range, wherein if the value exceeds or falls below the specified range a signal is generated and at least one of displayed and stored.

* * * * *